US011232783B2

(12) United States Patent
Yadav et al.

(10) Patent No.: US 11,232,783 B2
(45) Date of Patent: Jan. 25, 2022

(54) SYSTEM AND METHOD FOR DYNAMIC CLUSTER PERSONALIZATION

(71) Applicant: Samsung Electronics Co., Ltd., Suwon-si (KR)

(72) Inventors: Anil Yadav, Cupertino, CA (US); Chutian Wang, Mountain View, CA (US); Melvin Lobo, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 16/566,538

(22) Filed: Sep. 10, 2019

(65) Prior Publication Data

US 2020/0082811 A1 Mar. 12, 2020

Related U.S. Application Data

(60) Provisional application No. 62/730,457, filed on Sep. 12, 2018.

(51) Int. Cl.
*G10L 15/00* (2013.01)
*G10L 15/08* (2006.01)
(Continued)

(52) U.S. Cl.
CPC ............ *G10L 15/08* (2013.01); *G06F 16/337* (2019.01); *G06F 16/355* (2019.01); *G10L 15/005* (2013.01); *G10L 15/26* (2013.01)

(58) Field of Classification Search
CPC .. G06F 16/9535; G06F 16/337; G06F 16/335; G06F 16/355; G06F 16/51;
(Continued)

(56) References Cited

U.S. PATENT DOCUMENTS 6,647,383 B1 * 11/2003 August ............... G06F 16/9535
7,031,909 B2 4/2006 Mao et al.
(Continued)

FOREIGN PATENT DOCUMENTS

EP        2883366 A1    6/2015
KR  10-2018-0024167 A  3/2018

OTHER PUBLICATIONS

R. Gobinath and M. Hemalatha, "An optimized k-harmonic mean based clustering user navigation patterns," 2013 IEEE International Conference on Computational Intelligence and Computing Research, 2013, pp. 1-4. (Year: 2013).*

(Continued)

*Primary Examiner* — Edgar X Guerra-Erazo

(57) ABSTRACT

A system and method for dynamic cluster personalization is provided. A method of dynamic cluster personalization comprises acquiring information from a user, creating a usage log based on the acquired user information including language information and generating user features based on the usage log. The method further comprises determining a clustering feature from the user features, creating a user cluster based on the clustering feature, determining a personalization feature within the user cluster from the user features, generating a personalization for the user cluster based on the personalization feature and applying the personalization to the users in the user cluster.

20 Claims, 10 Drawing Sheets

(51) Int. Cl.
   *G06F 16/35* (2019.01)
   *G06F 16/335* (2019.01)
   *G10L 15/26* (2006.01)
(58) Field of Classification Search
   CPC .... G06F 16/5846; G06F 40/20; G06F 40/216; G06F 16/5866; G10L 15/005; G10L 15/063; G10L 15/08; G10L 15/02; G10L 15/183; G10L 15/30; G10L 17/00
   See application file for complete search history.

(56) References Cited

U.S. PATENT DOCUMENTS

| | | | |
|---|---|---|---|
| 7,624,015 | B1 | 11/2009 | Rahim et al. |
| 7,653,541 | B2 | 1/2010 | Ogawa |
| 8,880,629 | B1* | 11/2014 | Henrick .............. H04L 41/22 709/206 |
| 9,245,526 | B2 | 1/2016 | Chengalvarayan |
| 10,171,385 | B1* | 1/2019 | Henrick .............. A63F 13/35 |
| 10,223,462 | B2* | 3/2019 | Kim .............. G06F 16/9535 |
| 10,860,801 | B2* | 12/2020 | Yadav .............. G06F 16/355 |
| 2006/0143007 | A1 | 6/2006 | Koh et al. |
| 2007/0043768 | A1 | 2/2007 | Kang et al. |
| 2007/0124134 | A1 | 5/2007 | Van Kommer |
| 2008/0028036 | A1 | 1/2008 | Slawson et al. |
| 2009/0254836 | A1 | 10/2009 | Bajrach |
| 2010/0122178 | A1 | 5/2010 | Konig et al. |
| 2011/0107428 | A1* | 5/2011 | Yadav .............. H04L 63/0428 726/26 |
| 2017/0235743 | A1* | 8/2017 | Kim .............. G06F 16/9535 707/738 |
| 2018/0129971 | A1 | 5/2018 | Vlassis et al. |
| 2019/0140917 | A1* | 5/2019 | Henrick .............. A63F 13/69 |

OTHER PUBLICATIONS

F. Xhafa, S. Caballé, L. Barolli, A. Molina and R. Miho, "Using Bi-clustering Algorithm for Analyzing Online Users Activity in a Virtual Campus," 2010 International Conference on Intelligent Networking and Collaborative Systems, 2010, pp. 214-221. (Year: 2010).*

Kun-Lung Wu, C. C. Aggarwal and P. S. Yu, "Personalization with Dynamic Profiler," Proceedings Third International Workshop on Advanced Issues of E-Commerce and Web-Based Information Systems. WECWIS 2001, 2001, pp. 12-20. (Year: 2001).*

ISA/KR, International Search Report and Written Opinion of the International Searching Authority, International Application No. PCT/KR2019/011868, dated Dec. 23, 2019, 10 pages.

Supplementary European Search Report dated Aug. 4, 2021 in connection with European Patent Application No. 19 86 0973, 7 pages.

* cited by examiner

SYSTEM AND METHOD FOR DYNAMIC CLUSTER PERSONALIZATION

CROSS-REFERENCE TO RELATED APPLICATION AND PRIORITY CLAIM

This application claims priority under 35 U.S.C. § 119(e) to U.S. Provisional Patent Application No. 62/730,457 filed on Sep. 12, 2018. This provisional application is hereby incorporated by reference in its entirety.

TECHNICAL FIELD

This disclosure relates generally to a computing system and method, and more particularly to a machine learning based approach for generating user personalization clusters.

BACKGROUND

Personalization and clustering are widely used in commercial recommendation systems or any system that wants to provide personalized information. Currently, personalization can be offered to different users or groups of users via pre-defined feature sets and clustering processes. User information can be collected by systems according to pre-defined features, including behavior pattern, history, demographic information or other relevant features. Clustering systems can group users based on the pre-defined features. Systems can then provide personalization information to target the user or user groups.

Offering personalization via pre-defined feature sets does not allow for new features to be generated dynamically for clustering and personalization. Moreover, the system cannot dynamically update based on rapid-changing user language behavior and each user must go through a learning process before they can benefit from personalization.

SUMMARY

This disclosure provides a system and method for generating personalized clusters.

In a first embodiment, a method of operation of a computing system comprises acquiring information from a user including language information. The method includes creating a usage log based on the acquired user information. The method also includes generating user features based on the usage log. The method includes determining a clustering feature from the user features. The method also includes creating a user cluster based on the clustering feature, a user cluster comprising a plurality of users. The method includes determining a personalization feature within the user cluster from the user features. The method also includes generating a personalization for the user cluster based on the personalization feature. The method further includes applying the personalization to the users in the user cluster.

In a second embodiment, a computing system includes an input interface configured to receive a plurality of request inputs. The computing system includes at least one processor coupled to the input interface. The processor configured to acquire information from a user including language information; create a usage log based on the acquired user information; generate user features based on usage log; determine a clustering feature from the user features; create a user cluster based on the clustering feature, a user cluster comprising a plurality of users; determine a personalization feature within the user cluster from the user features; generating a personalization for the user cluster based on the personalization feature; and apply the personalization to the users in the user cluster.

In a third embodiment, a non-transitory computer readable medium configured to store a plurality of instructions is provided. The plurality of instructions, when executed by at least one processor, are configured to cause the at least one processor to acquire information from a user including language information; create a usage log based on the acquired user information; generate user features based on usage log; determine a clustering feature from the user features; create a user cluster based on the clustering feature, a user cluster comprising a plurality of users; determine a personalization feature within the user cluster from the user features; generating a personalization for the user cluster based on the personalization feature; and apply the personalization to the users in the user cluster.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
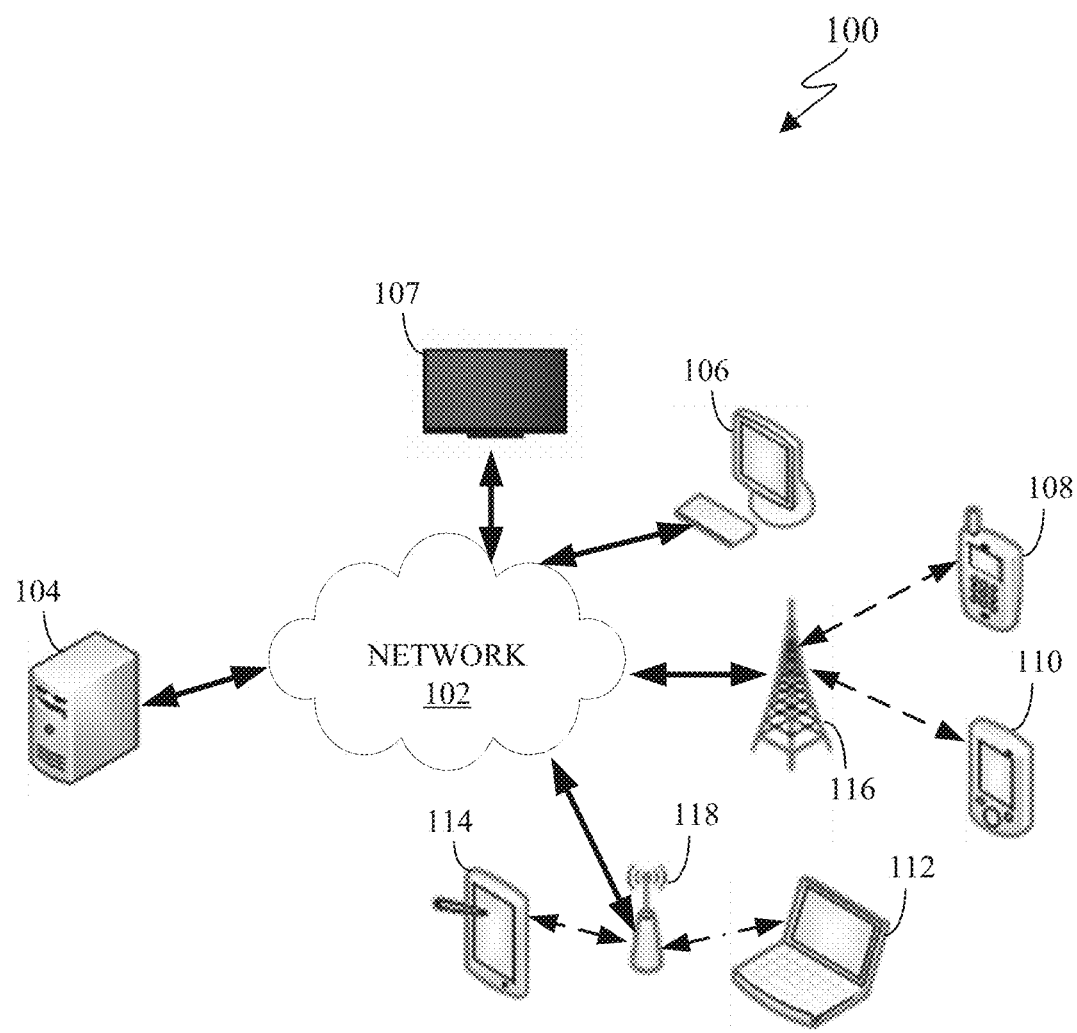
FIG. 1 illustrates an example communication system according to an embodiment of this disclosure.

FIGS. 1 through 9B discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

This disclosure generally provides a system and method for Dynamic Cluster Personalization (DCP). DCP generates cluster-specific personalization of each user-cluster based on clustering features and individual user personalization. According to embodiments of this disclosure DCP is applied to input received by an electronic device. A user can interact with an electronic device through the act of speaking. Speaking can include a human speaking directly to the electronic device, or another electronic device projecting sound through a speaker. Another approach to interacting with an electronic device can include providing an electronically typed or printed text, which includes a request to an electronic device, whereby the electronic device reads the request of the user. According to embodiments of this disclosure additional methods of interacting with an electronic device are included, such as the transmission (wired or wirelessly) of a request from one electronic device to another electronic device.

As an electronic device receives voice commands from a user, the electronic device is able to process the commands using automatic speech recognition (ASR) and natural language understanding (NLU). ASR identifies speech signals and converts the signals to text. NLU enables an understanding of natural language when spoken by a user. For example, if a user says "I need gas" the electronic device can process the request to identify that the user needs directions to a gas station. The electronic device is configured to launch an application that would give the user directions to a gas station. That is, ASR is able to convert speech to text and NLU is able to process the text to understand and predict the intent of the user.

According to embodiments of this disclosure, DCP collects language information, from ASR and NLU which include intent, behavior, syntactic patterns, ontology behavior, language, accent and more. DCP also collects user profile information and information related to the user device. From the collected information, DCP generates cluster-specific personalization based on the features and individual user personalization. DCP manages users and user-clusters and users can link to multiple personalizations from different user-clusters based on their features. DCP provides users customized content or service based on both individual personalization and cluster personalization. DCP tracks links between users and clusters and updates users' personalization whenever users interact with the system.

According to embodiments of this disclosure, after DCP collects enough personal personalization updates, a cluster personalization update process is triggered. The entire user cluster can benefit from the updated cluster personalization. DCP monitors features as they are being created or pre-defined and triggers re-clustering when the change of a certain feature's impact on the entire cluster network reaches a re-clustering threshold.

FIG. 1 illustrates an example communication system 100 in accordance with embodiments of this disclosure. The embodiment of the system 100 shown in FIG. 1 is for illustration only. Other embodiments of the system 100 can be used without departing from the scope of this disclosure.

The system 100 includes a network 102 that facilitates communication between various components in the system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a TV, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each client device 106-114 represents any suitable computing or processing device that interacts with at least one server (such as the server 104) or other computing device(s) over the network 102. In this example, the client devices 106-114 include a desktop computer 106, a TV 107, a mobile telephone or mobile device 108 (such as a smartphone), a PDA 110, a laptop computer 112, and a tablet computer 114. However, any other or additional client devices could be used in the system 100. Smartphones represent a class of mobile devices 108 that are handheld devices with mobile operating systems and integrated mobile broadband cellular network connections for voice, short message service (SMS), and Internet data communications. As described in more detail below, an electronic device (such as the desktop computer 106, TV 107, mobile device 108, PDA 110, laptop computer 112, or tablet computer 114) can include a user interface engine that modifies one or more user interface buttons displayed to a user on a touchscreen.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
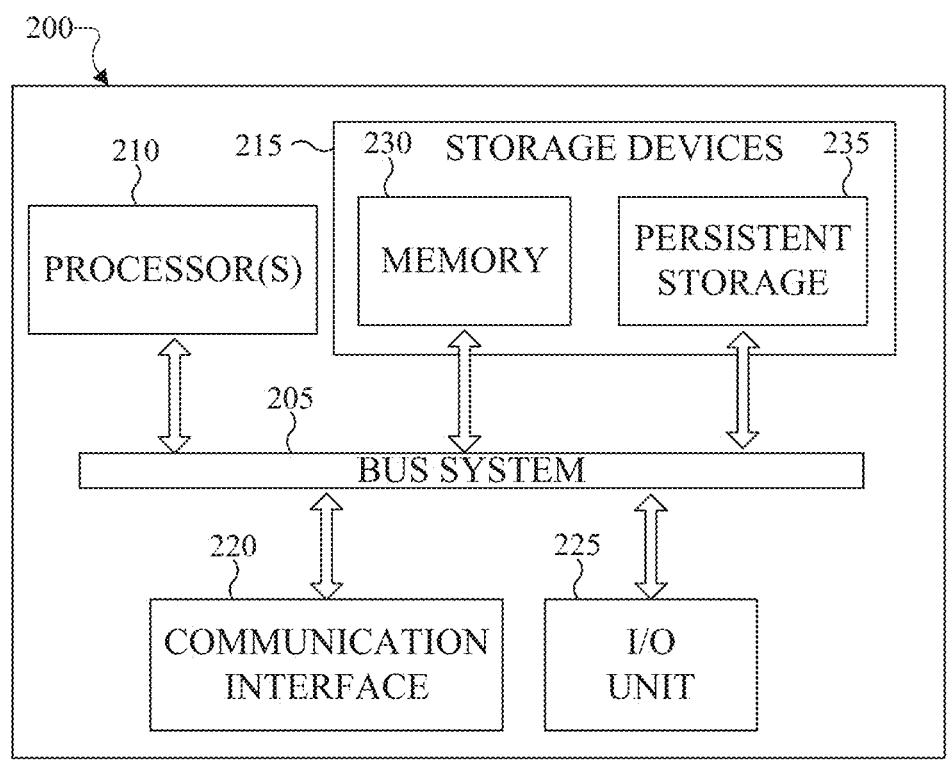
FIG. 2 illustrates an example server according to an embodiment of this disclosure.
Figure 3:
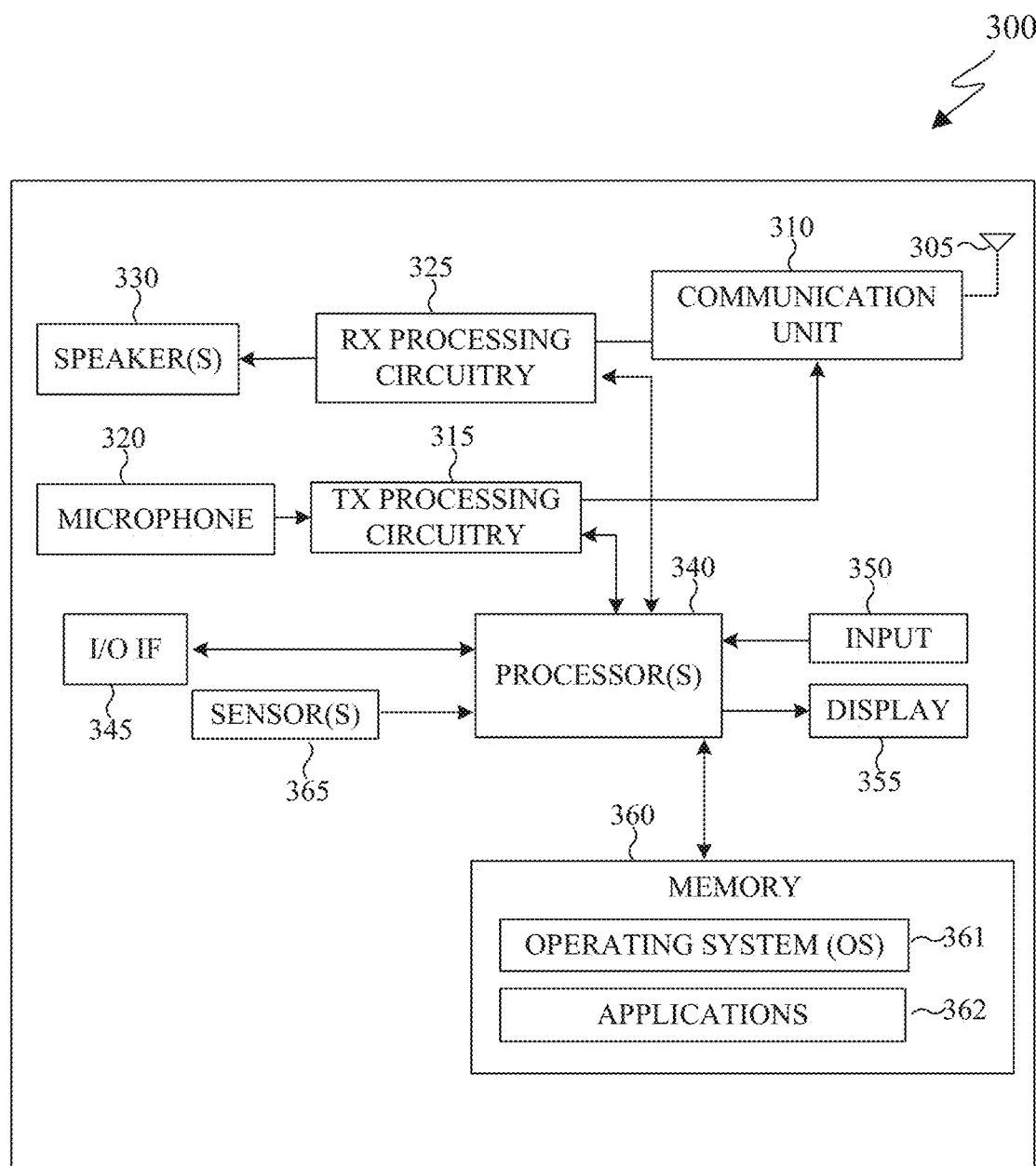
FIG. 3 illustrates an example electronic device according to an embodiment of this disclosure.

FIGS. 2 and 3 illustrate example devices in a communication system, such as the communication system 100 in FIG. 1, in accordance with embodiments of this disclosure. In particular, FIG. 2 illustrates an example server 200, and the server 200 could represent the server 104 in FIG. 1. The server 200 can represent one or more local servers, one or more remote servers, clustered computers and components that act as a single pool of seamless resources, a cloud-based server, a neural network, and the like. The server 200 can be accessed by one or more of the client devices 106-114.

As shown in FIG. 2, the server 200 includes a bus system 205 that supports communication between at least one processing device 210, at least one storage device 215, at least one communications interface 220, and at least one input/output (I/O) unit 225.

The processing device 210, such as a processor, executes instructions that can be stored in a memory 230. The processing device 210 can include any suitable number(s) and type(s) of processors or other devices in any suitable arrangement. Example types of the processing devices 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a RAM or any other suitable volatile or non-volatile storage device(s). The persistent storage 235 can contain one or more components or devices supporting longer-term storage of data, such as a hard drive, ROM, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. In some embodiments, the electronic device 300 is useable with data transfer applications, such providing and receiving information from a server. The electronic device can be a TV (such as SAMSUNG SMART TV®). The electronic device 300 can be a digital video disc (DVD) player, a TV box (such SAMSUNG HOMESYNC, APPLETV, or GOOGLE TV), a gaming console (such as an XBOX, PLAYSTATION, or NINTENDO), or any of the other types of electronic devices described above. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The communication unit 310 receives, from the antenna 305, an incoming RF signal transmitted from an access point (such as a base station, WI-FI router, or Bluetooth device) or other device of the network 102 (such as a WI-FI, Bluetooth, cellular, 5G, LTE, LTE-A, WiMAX, or any other type of wireless network). The communication unit 310 downconverts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361, in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360, such as operations that receive, store, and timely instruct by providing an input into a neural network. The processor 340 can move data into or out of the memory 360 as required by an executing process. In some embodiments, the processor 340 is configured to execute a plurality of applications 362 based on the OS 361 or in response to signals received from external source(s) or an operator. Example applications 362 can include a camera application (for still images and videos), a video phone call application, an email client, a social media client, an SMS messaging client, a virtual assistant, and the like. The processor 340 is also coupled to the I/O interface 345 that provides the electronic device 300 with the ability to connect to other devices, such as client devices 104-116. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing, thereby allowing a user to input a voice command. As another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. Input 350 can be associated with sensor(s) 365 and/or a camera by providing additional input to processor 340. In some embodiments, the sensor 365 includes one or more inertial measurement units (IMUS) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The electronic device 300 further includes one or more sensors 365 that can meter a physical quantity or detect an activation state of the electronic device 300 and convert metered or detected information into an electrical signal. For example, the sensor 365 can include one or more buttons for a touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of devices in a communication system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
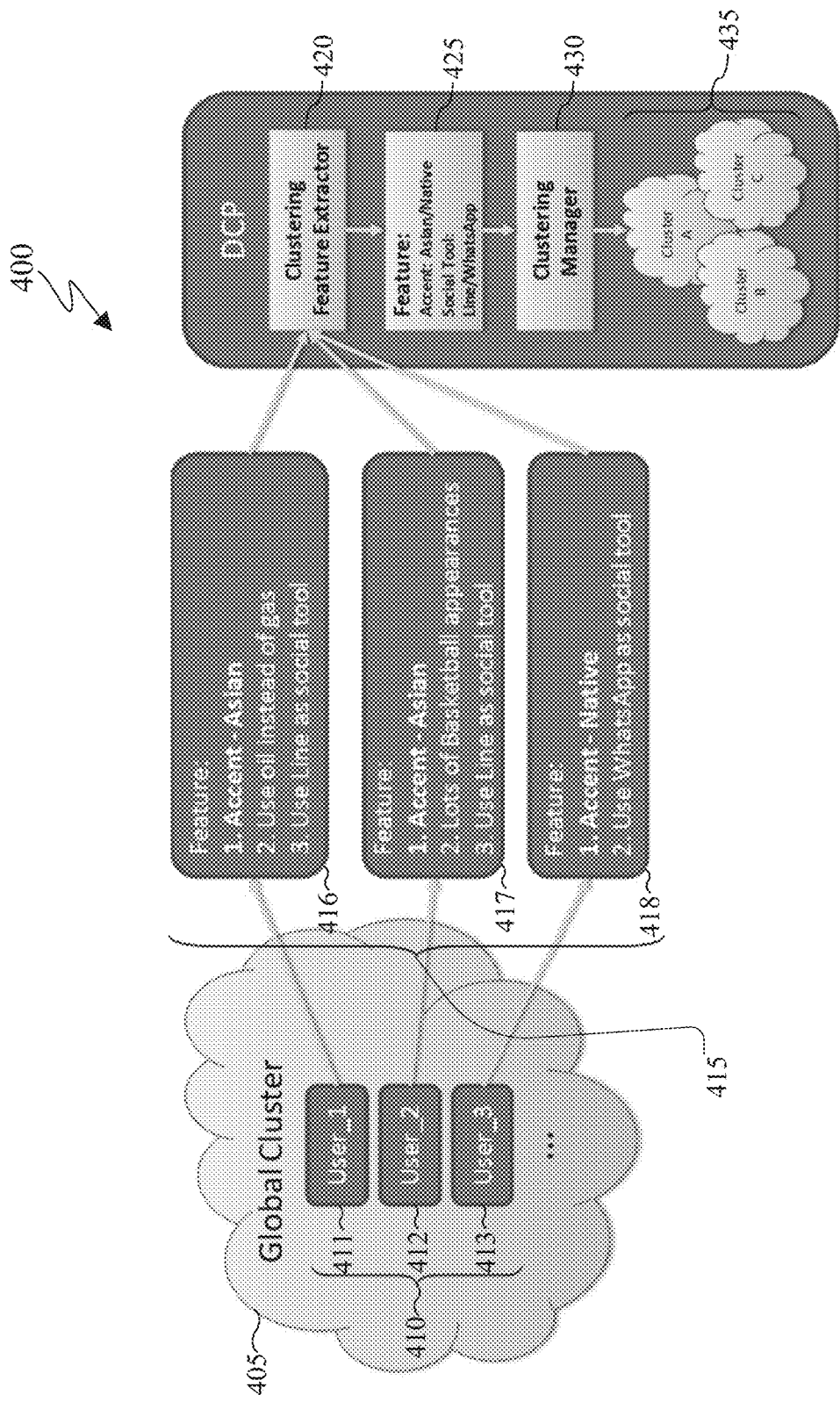
FIG. 4 illustrates an example of determining clustering features to create user clusters according to embodiments of this disclosure.

FIG. 4 illustrates an example 400 of determining clustering features to create user clusters according to embodiments of this disclosure. The embodiment of determining user cluster features to create user clusters as shown in FIG. 4 is for illustration only and other embodiments could be used without departing from the scope of the present disclosure.

Referring to the non-limiting example of FIG. 4 a Global Cluster 405 contains a plurality of user information, including language information, stored in usage logs 410. As will be describe in more detail below, with reference to FIG. 7, user language information comprises information that is collected through a user's language interactions with an electronic device 300. A user's language interactions are spoken voice commands or language inputs that direct the electronic device to perform a request. For example, a user can speak the request "Find the nearest gas station," and the electronic device, through language processing methods such as Automatic Speech Recognition (ASR) and Natural Language Understanding (NLU), can execute the command to open a driving directions application on the electronic device and display the nearest gas station. This user language information is shared with a server, such as the server 104 of FIG. 1, or the server 200 of FIG. 2. The server 104 stores and tracks a plurality of user language information in a plurality of usage logs 410. The Global Cluster 405 contains the plurality of usage logs 410.

The server performs Dynamic Cluster Personalization (DCP) on the plurality of user language information. DCP creates user features 415 by learning users' language frame, determining NLU intention, tracking users' behavior, tracking users' feedback and other methods. DCP learns not only from executable inputs to the electronic device 300, but also tracks and records inputs that the current system cannot understand for future use. DCP extracts user features 415 from the plurality of usage logs 410. A user feature 415 is related to the user's language interactions with the electronic device 300. For example, a user feature 415 might include the accent of the user. Another user feature 415 might be a word frequently used by a user related to a common request, such as using the word "oil" instead of "gas" in relation to fuel for a vehicle. Other examples include a user's choice of social media tools and repeated domain searches.

FIG. 4 illustrates examples of user features 415 that are created by DCP. User_1 features 416 created from usage log 411 include "Accent-Asian," "Use oil instead of gas," and "Use Line as social tool." User_2 features 417 from usage log 412 include "Accent-Asian," "Lots of Basketball searches," and "Use Line as social tool." User_3 features 418 from usage log 413 include "Accent-Asian," and "Use WhatsApp as social tool."

The Clustering Feature Extractor 420 collects all the user features 415 and extracts or determines at least one clustering feature 425 as part of DCP. DCP dynamically selects the most important user features 415 as the clustering features 425 by performing algorithms like Principal component analysis (PCA), Multi-linear Principal Component Analysis (MPCA), Autoencoder, etc. Multiple different sets of clustering features 425 can exist at the same time base on how fine-grained personalization DCP provides. For example, as illustrated in FIG. 4, two clustering features 425, "Accent-Asian" and "Social Tool-Line/Whats App," are extracted.

The Clustering Manager 430 generates or creates multiple user clusters 435 based on extracted clustering features 425 using clustering algorithms like K-means clustering, Hierarchical clustering or Density-Based Clustering of Applications with Noise (DBSCAN). Each user cluster 435 represents a group of users who share some certain attributes related to the extracted clustering features 425. Cluster A, Cluster B, and Cluster C, as illustrated in FIG. 4, are examples of the user clusters 435. User clusters 435 are allowed to have overlapping based on how fine-grain personalization is targeted. Once clustering is finished, DCP starts building personalization for each user cluster 435 as explained in more detail with reference to FIG. 5.

Figure 5:
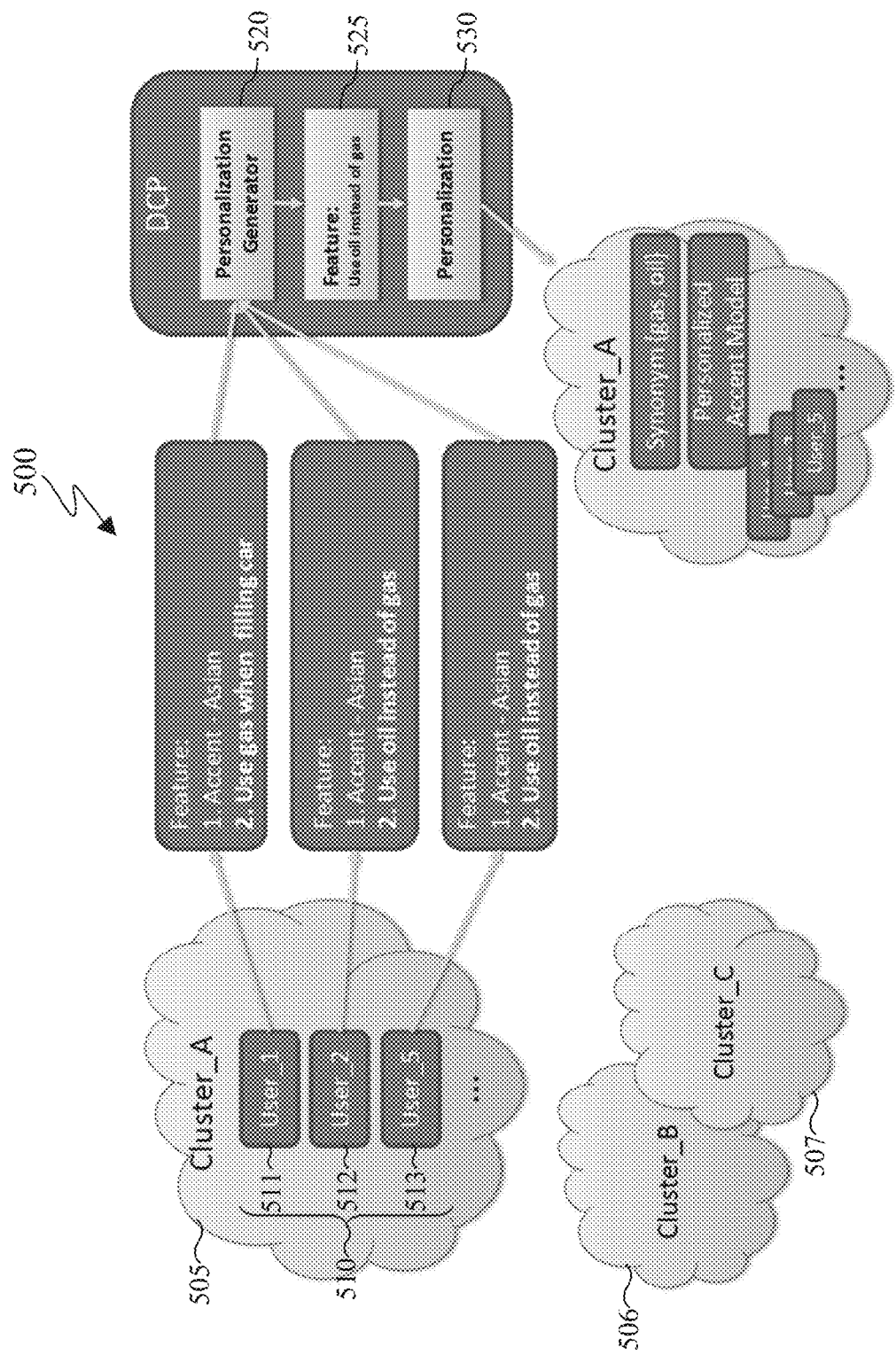
FIG. 5 illustrates an example of building personalization for user clusters using DCP according to embodiments of this disclosure.

FIG. 5 illustrates an example 500 of building personalization for user clusters using DCP according to embodiments of this disclosure. The embodiment of the example for building personalization as shown in FIG. 5 is for illustration only and other embodiments could be used without departing from the scope of the present disclosure.

Referring to the non-limiting example of FIG. 5, the user clusters 505, 506, 507 contain a plurality of users that all share a common feature or clustering feature 425. The user clusters 505 are the same as user clusters 435 illustrated in FIG. 4, generated as a result of the clustering process 400. For example, the plurality of users 510 in Cluster_A 505 all share the clustering feature of "Accent-Asian." The plurality of users 510 also share other common features. For example, User_2 512 and User_5 513 both use the word "oil" instead of "gas" when referring to putting fuel in a vehicle. User_1 511, however, uses the term "gas" when referring to putting fuel in a vehicle. The Personalization Generator 520 is able to create a personalization 530 for the user cluster 505 based on the other common features. The Personalization Generator 530 selects a personalization feature 525 by picking the top common feature within the user cluster 505. For example, if a large number of users in Cluster_A (all of which have an Asian accent) use the term "oil" instead of "gas" when referring to putting fuel in a vehicle, DCP creates a personalization 530 for Cluster_A 505 to use "oil" and "gas" as synonyms when executing a user language request. The personalization 530 is applied to the entire user cluster 505. According to embodiments of this disclosure, a User_1 511 may not have any history of using the term "oil." DCP applies the personalization 530 to User_1 511. Based on User1's 511 membership in Cluster_A 505, the first time User_1 511 speaks a command such as "Find oil for my car," the user's electronic device 300 will execute instructions to find the nearest gas station as a result of DCP.

Figure 6:
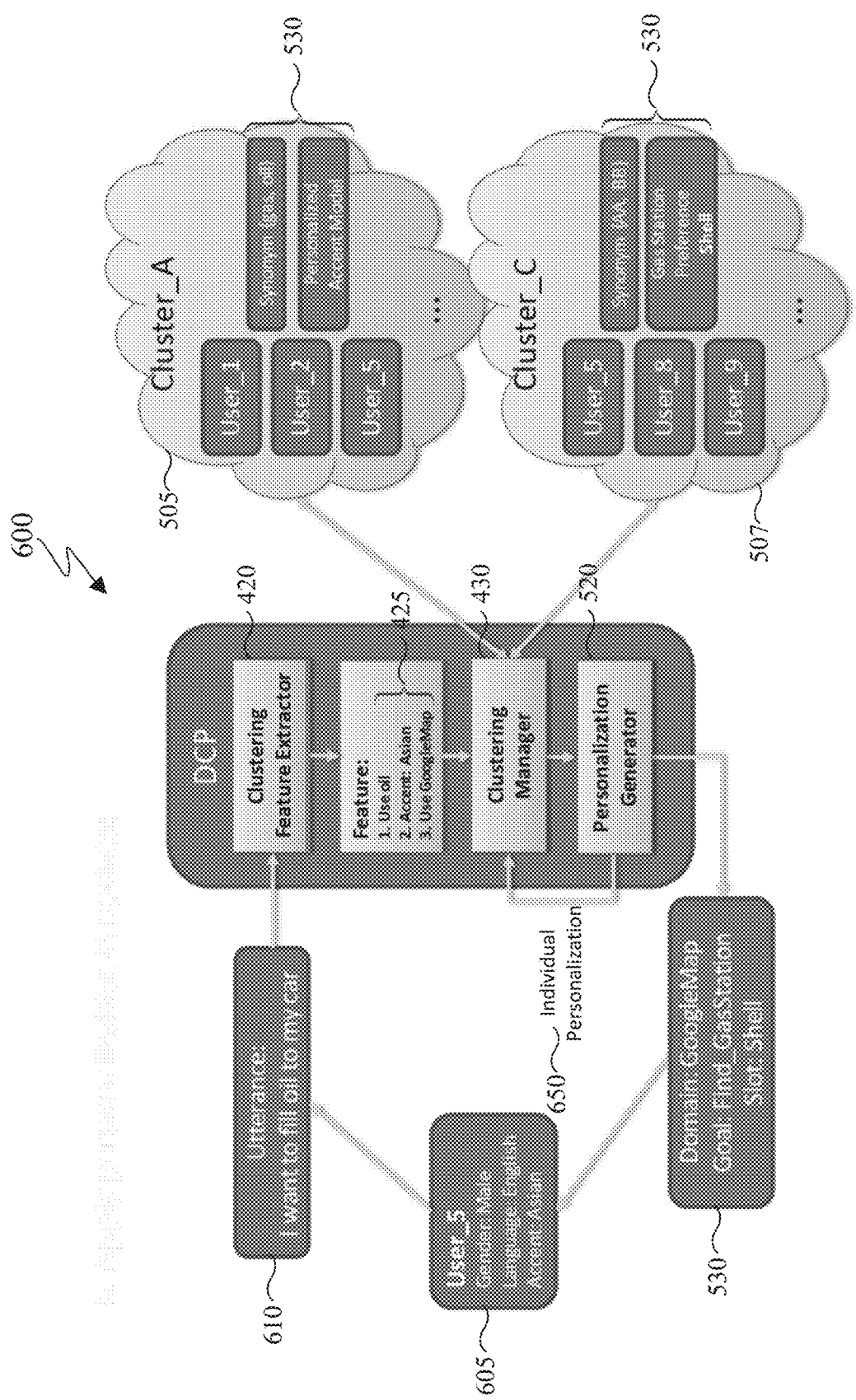
FIG. 6 illustrates an example of applying personalization to a user according to embodiments of this disclosure.

FIG. 6 illustrates an example 600 of applying personalization to a user according to embodiments of this disclosure. The embodiment of applying personalization to a user as shown in FIG. 6 is for illustration only and other embodiments could be used without departing from the scope of the present disclosure.

Referring to the non-limiting example of FIG. 6, a user, User_5, 605 speaks a request 610 to the user's electronic device 300, such as "I want to fill oil to my car." DCP has previously tracked features of User_5 to include "Gender: Male," "Language: English," and "Accent: Asian." The spoken request, or utterance, 610 is part of the user language acquired by the DCP process. Also acquired as part of the user information is the user's interaction to use GoogleMap to provide directions to a gas station. The Clustering Feature Extractor 420 generates user features and determines clustering features 425 using algorithms as described in reference to FIG. 4. The Clustering Manager 430 determines that User_5 605 belongs to Cluster_A 505 and Cluster_C 507 based on previous user language occurrences. Cluster_A 505 contains a personalization 530 based on the clustering feature 425 "Accent: Asian" to use the terms "gas" and "oil" as synonyms. Cluster_C 507 contains a personalization 530 based on "Gas Station Preference: Shell" to use the terms "AA" and "BB" as synonyms. For example, "AA" can be "Shell" and "BB" can be "gas station." The Clustering Manager 430 also determines if there is another cluster that User_5 605 is likely to belong to based on the clustering feature 425 "Use GoogleMap." If there are no user clusters based on the clustering feature 425 "Use GoogleMap" the Clustering Manager 430 keeps track of the new user language information in the user usage log. In other words, DCP keeps track of the number of times User_5 605 uses the GoogleMap application following a request related to finding a gas station.

Personalization Generator 520 generates an individual personalization 650 for User_5 605 based on the additional clustering feature 425 "Use GoogleMap." The individual personalization 650 is shared with the Clustering Manager 430 so that DCP can dynamically update clusters and make further changes if necessary. The Personalization Generator 520 then applies the personalization 530 from Cluster_A 505 and the personalization 530 from Cluster_C 507 as well as the individual personalization 650 to User_5 605. The personalization 530 as applied to User_5 605 results in the user's electronic device 300 to use the GoogleMap application for finding directions to the gas station and that the gas station preference is Shell in response to the utterance "I want to fill oil to my car."

Figure 7:
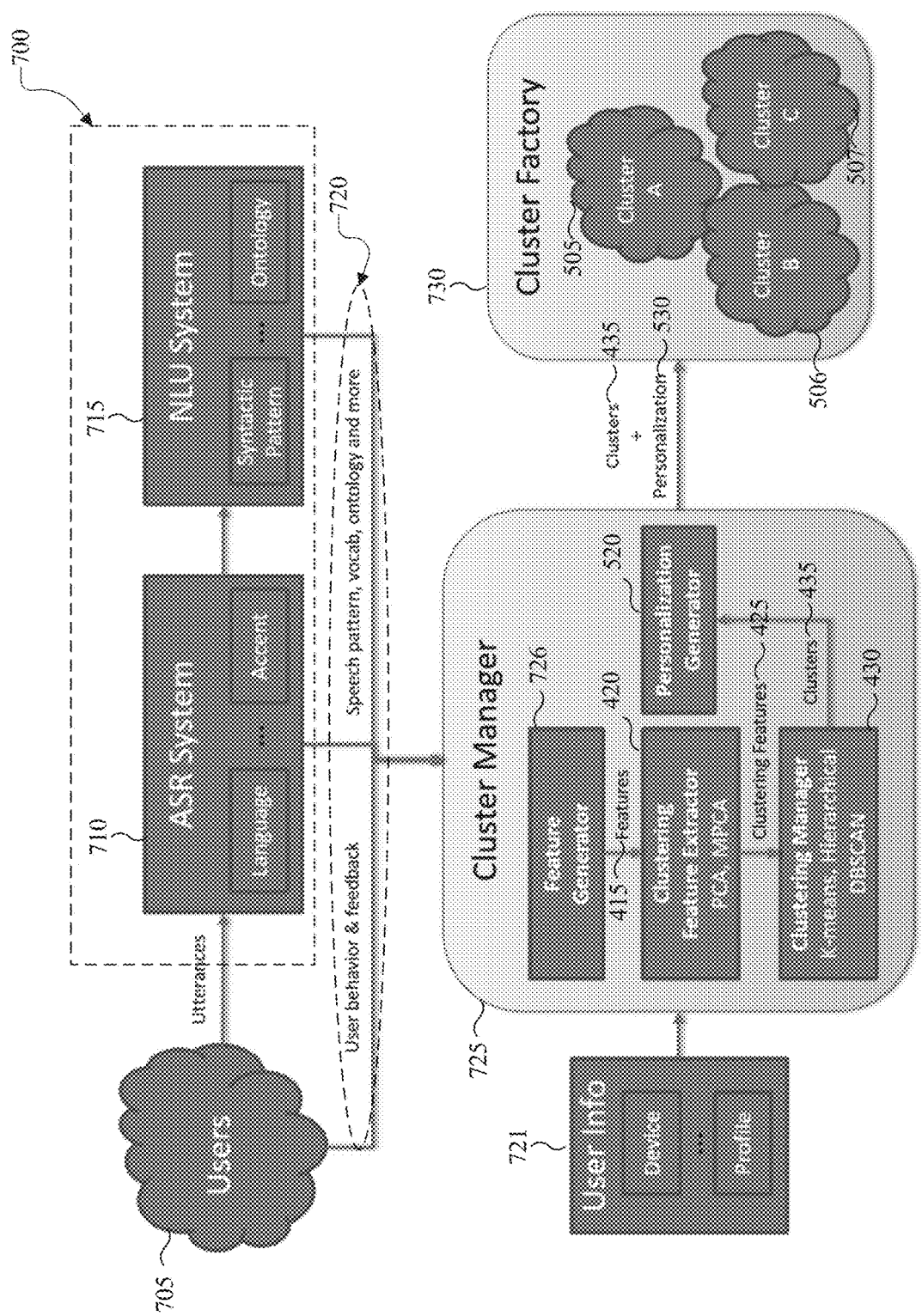
FIG. 7 illustrates an example architecture for dynamic user cluster generation according to embodiments of this disclosure.

FIG. 7 illustrates an example architecture for dynamic user-cluster generation, according to embodiments of this disclosure. The embodiment of the architecture for dynamic user-cluster generation as shown in FIG. 7 is for illustration only and other embodiments could be used without departing from the scope of the present disclosure.

Referring to the non-limiting example of FIG. 7, an electronic device 700, such as the electronic device 300 of FIG. 3, is configured to receive speech commands or utterances from a user 705 via a microphone. According to embodiments of this disclosure, the electronic device 700 is understood to be a mobile phone. The electronic device 700 is configured extract language information 720 including user behaviors and feedback, speech patterns, vocabulary, ontology and more utilizing Automatic Speech Recognition (ASR) systems 710 and Natural Language Understanding (NLU) 715 systems. Included in the language information 720 are speech command inputs that the current system cannot understand or interpret. By combining all inputs with users' feedback, DCP can map input to proper NLU presentation and creates dynamic personal features from them. The dynamic user features that represents users' semantic or syntactic personalization becomes a part of the entire user feature set. Pre-defined feature sets, including language, accent, speech pattern, vocabulary, ontology, behavior patterns, demographic information, NLU usage and more can also be collected as part of language information 720. The language information 720 is saved in usage logs. A Cluster Manager 725 receives the language information 720 as well as other information 721 related to the user. The user information 721 includes but is not limited to information about the user's electronic device 700 and profile information.

According to embodiments, a Cluster Manager 725 provides the architecture to generate clusters and personalization as previously disclosed in reference to FIGS. 4 and 5. The Cluster Manager 725 provides a Feature Generator 726 that analyzes the language information 720 and user information 721 to extract user features 415.

The generated user features 415 are then processed by the Clustering Feature Extractor 420. The Clustering Feature Extractor 420, as explained above with reference to FIG. 4, uses algorithms to select the most important generated user features 415 as clustering features 425. Multiple different sets of clustering features 425 can exist at the same time based on how fine-grained personalization the system provides.

Multiple user clusters 435 based on the clustering features 425 are then generated by the Clustering Manager 430. The Clustering Manager 430, as explained above with reference to FIG. 4, uses clustering algorithms to produce user clusters 435. The resulting user clusters 435 contain a plurality of users who share certain features or attributes in common.

Next a Personalization Generator 520 builds personalization 530 for each user cluster 435 based on the clustering features 425 and other common features as previously explained with reference to FIG. 5. The clusters 435 and personalizations 530 are sent to the Cluster Factory 730 where dynamic management of the clusters occurs to provide inferences to be used in providing customized content. The Cluster Factory's ability to dynamically manage the clusters is described in more details with reference to FIG. 8.

Figure 8:
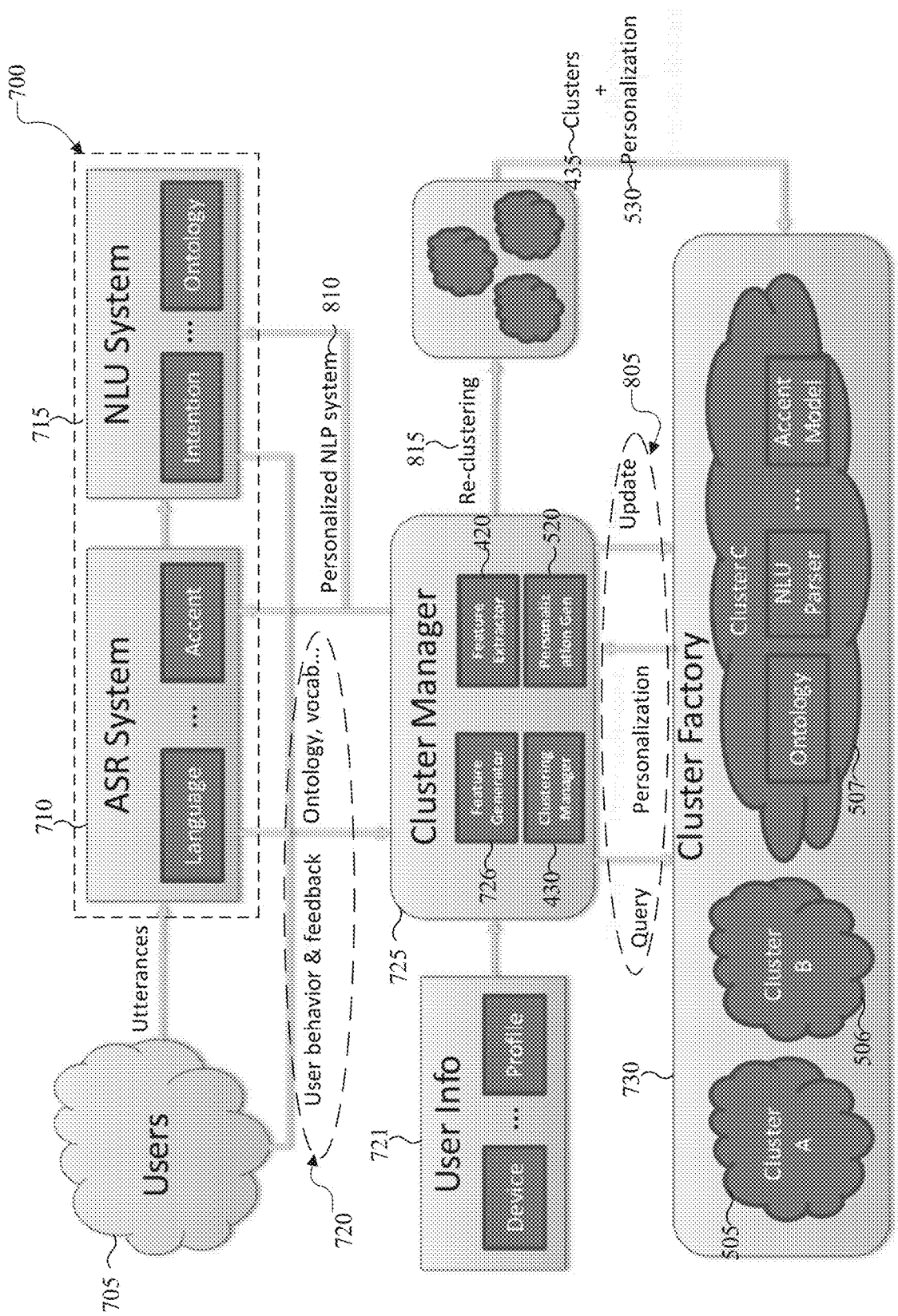
FIG. 8 illustrates an example architecture for dynamic user cluster generation and building inferences according to embodiments of this disclosure.

FIG. 8 illustrates an example architecture for dynamic user-cluster generation and building inferences according to embodiments of this disclosure. The embodiment of the architecture for dynamic user-cluster generation and building inferences as shown in FIG. 8 is for illustration only and other embodiments could be used without departing from the scope of the present disclosure.

According to embodiments of this disclosure, the many of the architectural details illustrated in FIG. 8 are the same as the ones described in FIG. 7. Accordingly, this disclosure refers to the different processes that take place for dynamic updating and management in order to provide customized content in reference to FIG. 8. Referring to the non-limiting example of FIG. 8, the Cluster Factory 730 stores the user clusters 505, 506, 507 generated by the Cluster Manager 725. Each user cluster 505, 506, 507 can contain a plurality of personalizations 530. The personalizations 530 covers any components that users may use in a voice assistant system, including but not limited Language Model, Accent Model, Ontology, NLU parsers and vocabulary. Users can link to different user clusters 505, 506, 507 based on their features so that they can benefit from different aspects of personalization. The Cluster Manager 725 and Cluster Factory 730 interact 805 to determine what to do with new input or new users and how to properly apply personalizations and updates.

For example, when new input 720 is received, DCP captures it and stores it along with existing data and updates those users' personalization 530. DCP extracts features 420 from the new input 720. DCP makes decisions based on whether a new feature 420, is crucial to clustering features 425 or not, according to embodiments of this disclosure. If the new feature 420 is crucial or related to existing clustering features 425, DCP updates personalization 530 of the corresponding user cluster 505, 506, 507. If the new feature 420 is not relevant to current clustering features 425, DCP generates an individual personalization and applies it to the user. DCP also stores information related to the individual personalization inside the corresponding user cluster 505, 506, 507. When the usage of the new feature 420 in that user cluster 505, 506, 507 reaches an update frequency threshold, DCP updates personalization 530 of the user cluster 505, 506, 507 based on the new feature 420. The update frequency threshold can start with a minimum value and then be defined by the average of previous new features' popularity index in a relative window. The update frequency threshold can also be a predetermined value. If DCP updates a user cluster's personalization 530 based on the new feature 420, the update is dynamically applied to the entire cluster so that users in the cluster who have not gone through similar personalization learning processes, can also benefit from updated personalization.

According to embodiments of this disclosure when a new user sends a request, DCP can decide which user cluster 505, 506, 507 the new user should belong to in real time by analyzing the user language information 720 and user information 721 and the user request using k-nearest neighbors algorithm (k-NN). Then personalization of the closest user clusters will be applied. DCP will not take the new user's information into clustering until the amount of the new user's data reaches a threshold value for a valid user.

According to embodiments of this disclosure, DCP provides for re-clustering 815 if necessary. DCP permanently stores user usage logs according to embodiments of this disclosure. By doing so, DCP can periodically extract user's language pattern features from the historical information and calculate similarities between the language pattern features and user clusters. DCP manages users among all user clusters and knows when and how to generate cluster personalization based on this information. In addition, DCP keeps track of all cluster personalization updates globally. When accumulated personalization updates reach a clustering threshold, DCP starts validation process for re-clustering and re-calculates personalization if it is necessary.

The resulting personalized natural language processing system 810 is shared with the ASR system 710 and NLU system 715 to provided personalized, dynamically update content to a user 705 interacting with the electronic device 700.

Figure 9A:
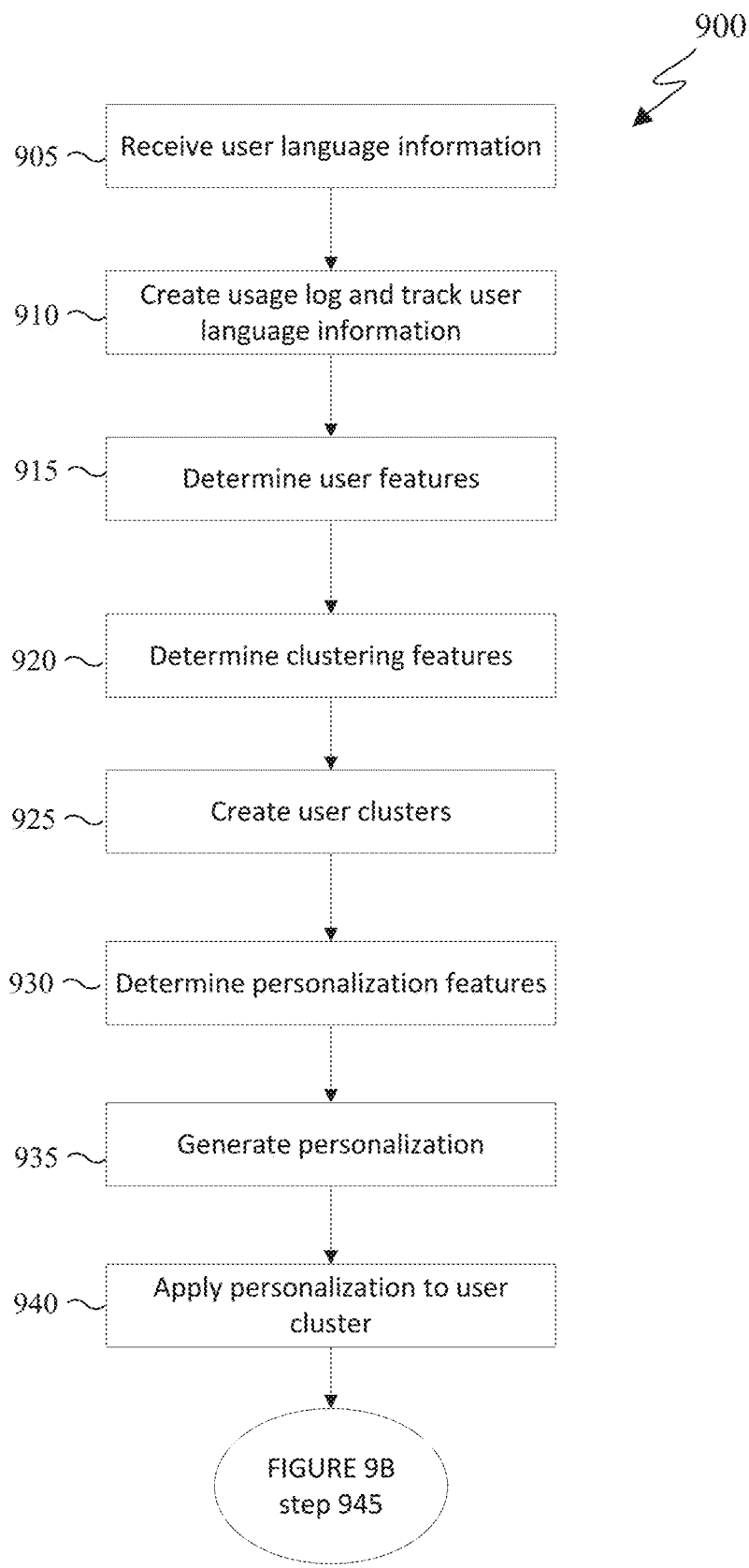
FIGS. 9A and 9B illustrate a block diagram of an example method of Dynamic Cluster Personalization to provide updated content to an electronic device according to embodiments of this disclosure.
Figure 9B:
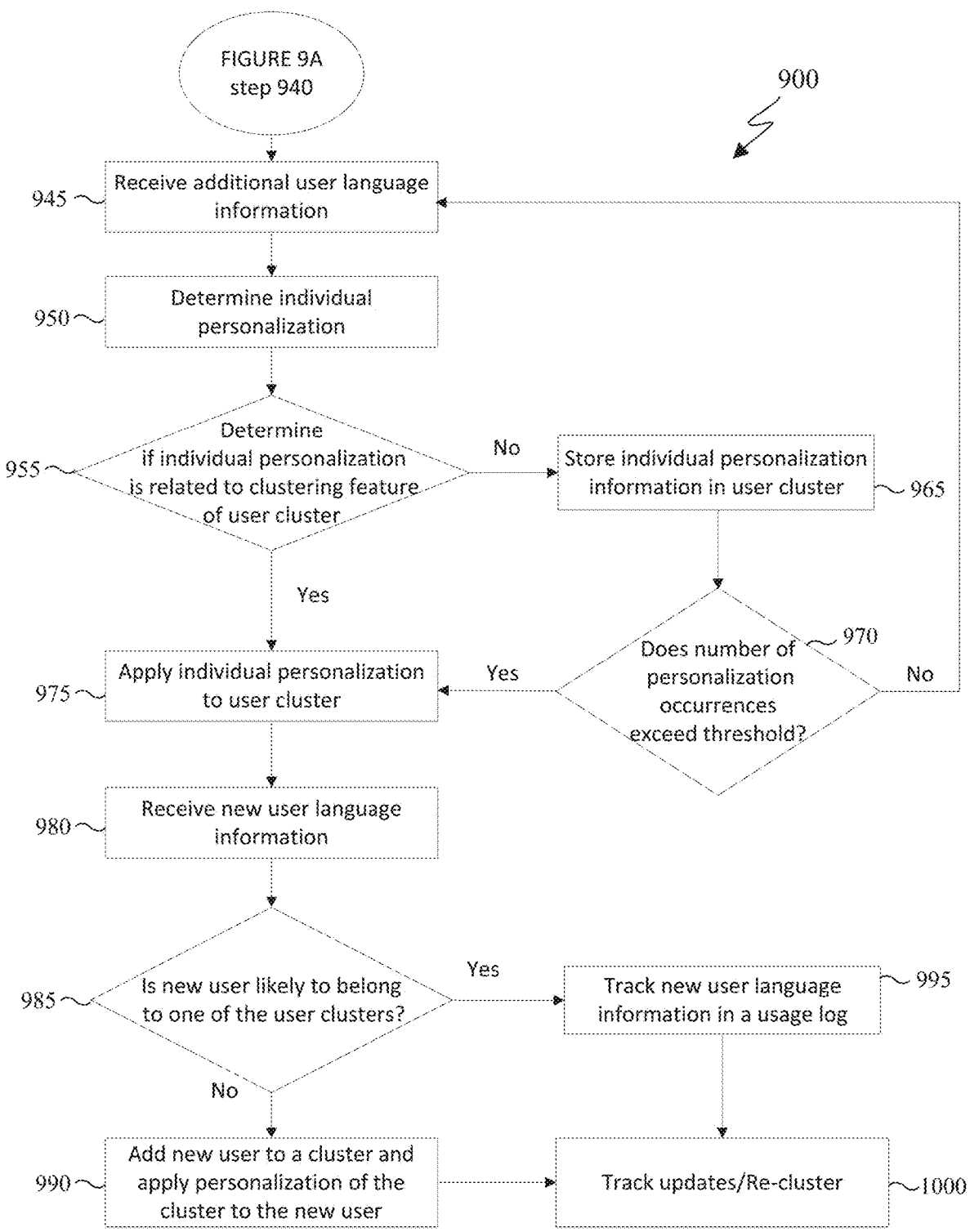

FIGS. 9A and 9B illustrate a block diagram of an example method 900 of DCP to provide updated content to an electronic device according to embodiments of this disclosure. The method 900 may be performed by the server 104 or any of the client devices 106-114 of FIG. 1, the server 200 of FIG. 2, the electronic device 300 of FIG. 3, or any other suitable device or system. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

In block 905, the server 104 receives user language information from an electronic device. The user language information can be obtained by the electronic device through verbal, manual or other language commands received by the electronic device. The user language information includes information from users' language frame, users' NLU intention, users' behaviors, users' feedback and more. The user language information also includes information related to users' electronic devices and profile information.

In block 910, the server 104 creates a usage log for each user based on the acquired user language information. The server dynamically updates the usage logs when new language input is received and throughout the DCP process.

In block 915, DCP determines user features for all users from the usage logs. The user features include typical NLU features, like accent, speech pattern, vocabulary, ontology, behavior pattern, demographic information, NLU usage and new features created by DCP, including slang, appearance of word, misuse of certain phrase and more.

In block 920, DCP determines clustering features from the usage features. DCP dynamically selects the most important user features as the clustering features by performing algorithms like PCA, MPCA, Autoencoder, etc. Multiple different sets of clustering features can exist at the same time.

In block 925, DCP creates user clusters based on the clustering features using clustering algorithms like K-means clustering, Hierarchical clustering or DBSCAN. Each user cluster represents a group of users who share some certain attributes related to at least one of the clustering features.

In block 930, DCP determines a personalization feature within a user cluster from the user features. The personalization feature is selected by picking the top common user feature, other than the clustering feature, within a user cluster. At least one personalization feature is determined for each user cluster.

In block 935, DCP generates a personalization for the user cluster based on the personalization feature. In block 940, DCP applies the personalization to the entire user cluster. The personalization is shared with the electronic device of each user to provide updated content to the electronic device's NLU system and ASR system. Each user cluster can have multiple personalizations.

In block 945, a plurality of additional user language information is received by the server. The server stores the additional language information in the usage log associated with the user that provides the additional user language information.

In block 950, DCP determines an individual personalization based on the plurality of additional user language information and applies the personalization to the user. In block 955, DCP determines if the individual personalization is related to the clustering feature of the user cluster. If DCP determines that the individual personalization is related to the clustering feature of the user cluster, DCP updates the personalization of the user cluster based on the plurality of additional language information in block 960. If the individual personalization is determined to not be related to the clustering feature, DCP stores individual personalization information, including a number of individual personal occurrences, in the user cluster in block 965. DCP determines if a number of individual personalization occurrences exceeds a threshold value in block 970 and if it does it applies the individual personalization to the plurality of users in the user cluster in block 975. If the number of individual personalization occurrences does not exceed the threshold value in block 970 the process returns to the collection or receipt of additional user language information in block 945.

In block 980, the server receives language information from a new user. In block 985, DCP determines whether the new user is likely to belong to a user cluster based on a comparison of the new user language information and the clustering feature of the user cluster. If the new user is likely to belong to a user cluster, DCP adds the new user to the user cluster and applies the personalization of the user cluster to the new user in block 990.

In block 995, the new user language information is tracked in a usage log. DCP does not generate user features based on the new user usage log until the new user language information reaches a valid user threshold number. Once the valid threshold number is reached, DCP can dynamically update its process to include features generated from the new user usage log.

In block 1000, DCP tracks all cluster personalization updates and when accumulated personalization updates reach a clustering threshold, validation processes re-cluster and re-calculate personalization.

Although various features have been shown in the figures and described above, various changes may be made to the figures. For example, the size, shape, arrangement, and layout of components shown in FIGS. 1 through 9B, are for illustration only. Each component could have any suitable size, shape, and dimensions, and multiple components could have any suitable arrangement and layout. Also, various components in FIGS. 1 through 9B could be combined, further subdivided, or omitted and additional components could be added according to particular needs. Further, each component in a device or system could be implemented using any suitable structure(s) for performing the described function(s). In addition, whiles FIGS. 9A and 9B illustrate various series of steps, various steps in FIGS. 9A and 9B could overlap, occur in parallel, occur multiple times, or occur in a different order.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method comprising:
   acquiring information from a user including language information;

creating a usage log based on the acquired user information;
generating user features based on the usage log;
determining a clustering feature from the user features;
creating a user cluster based on the clustering feature, the user cluster comprising a plurality of users;
determining a personalization feature within the user cluster from the user features;
generating a personalization for the user cluster based on the personalization feature; and
applying the personalization to the users in the user cluster.

2. The method of claim 1, wherein the user information includes user requests, user behavior, user feedback, electronic device information or user profile information.

3. The method of claim 1, further comprising:
receiving a plurality of additional user information including language information;
storing the plurality of additional user information including language information in the usage log;
determining an individual personalization based on the plurality of additional user information including language information; and
applying the individual personalization to the user.

4. The method of claim 3, further comprising:
determining if the individual personalization is related to the clustering feature of the user cluster; and
updating the personalization based on the plurality of additional user information including language information when the individual personalization is determined to be related to the clustering feature.

5. The method of claim 4, further comprising:
storing individual personalization information in the user cluster when the individual personalization is determined to not be related to the clustering feature; and
applying the individual personalization information to the plurality of users in the user cluster when a determined number of individual personalization occurrences exceeds a threshold.

6. The method of claim 1, further comprising:
acquiring a request from another user including another user information;
determining whether the other user is likely to belong to the user cluster based on a comparison of the another user information and the clustering feature; and
when it is determined that the other user is likely to belong to the user cluster:
adding the other user to the user cluster, and
applying the personalization of the user cluster to the other user.

7. The method of claim 6, further comprising:
tracking the another user information in the usage log,
wherein generating user features based on the usage log includes the another user information when the another user information reaches a valid user threshold.

8. A computing system comprising:
an input interface configured to receive language information; and
at least one processor configured to:
acquire information including language information from a user;
create a usage log based on the acquired user information including language information;
generate user features based on usage log;
determine a clustering feature from the user features;
create a user cluster based on the clustering feature, the user cluster comprising a plurality of users;
determine a personalization feature within the user cluster from the user features;
generating a personalization for the user cluster based on the personalization feature; and
apply the personalization to the users in the user cluster.

9. The computing system of claim 8, wherein the user information includes user requests, user behavior, user feedback, electronic device information or user profile information.

10. The computing system of claim 8, wherein the at least one processor is configured to:
receive a plurality of additional user information including language information;
store the plurality of additional user information including language information in the usage log;
determine an individual personalization based on the plurality of additional user information including language information; and
apply the individual personalization to the user.

11. The computing system of claim 10, wherein the at least one processor is further configured to:
determine if the individual personalization is related to the clustering feature of the user cluster; and
update the personalization based on the plurality of additional user information including language information when the individual personalization is determined to be related to the clustering feature.

12. The computing system of claim 11, wherein the at least one processor is further configured to:
store individual personalization information in the user cluster when the individual personalization is determined to not be related to the clustering feature; and
apply the individual personalization information to the plurality of users in the user cluster when a determined number of individual personalization occurrences exceeds a threshold.

13. The computing system of claim 8, wherein the at least one processor is further configured to:
acquire a request from another user including another user information;
determine whether the other user is likely to belong to the user cluster based on a comparison of the another user information and the clustering feature; and
when it is determined that the other user is likely to belong to the user cluster:
add the other user to the user cluster, and
apply the personalization of the user cluster to the other user.

14. The computing system of claim 13, wherein the at least one processor is further configured to:
tracking the another user information in the usage log,
wherein generating user features based on the usage log includes the another user information when the another user information reaches a valid user threshold.

15. A non-transitory computer readable medium configured to store a plurality of instructions that, when executed by at least one processor is configured to cause the at least one processor to:
acquire information including language information from a user;
create a usage log based on the acquired user information including language information;
generate user features based on usage log;
determine a clustering feature from the user features;
create a user cluster based on the clustering feature, the user cluster comprising a plurality of users;

determine a personalization feature within the user cluster from the user features;

generating a personalization for the user cluster based on the personalization feature; and apply the personalization to the users in the user cluster.

16. The non-transitory computer readable medium of claim 15, wherein the user information includes user requests, user behavior, user feedback, electronic device information or user profile information.

17. The non-transitory computer readable medium of claim 15, wherein the plurality of instructions is further configured to cause the processor to:

receive a plurality of additional user information including language information;

store the plurality of additional user information including language information in the usage log;

determine an individual personalization based on the plurality of additional user information including language information; and apply the individual personalization to the user.

18. The non-transitory computer readable medium of claim 17, wherein the plurality of instructions is further configured to cause the processor to:

determine if the individual personalization is related to the clustering feature of the user cluster; and update the personalization based on the plurality of additional user information including language information when the individual personalization is determined to be related to the clustering feature.

19. The non-transitory computer readable medium of claim 18, wherein the plurality of instructions is further configured to cause the processor to:

store individual personalization information in the user cluster when the individual personalization is determined to not be related to the clustering feature; and apply the individual personalization information to the plurality of users in the user cluster when a determined number of individual personalization occurrences exceeds a threshold.

20. The non-transitory computer readable medium of claim 15, wherein the plurality of instructions is further configured to cause the processor to:

acquire a request from another user including another user information;

determine whether the other user is likely to belong to the user cluster based on a comparison of the another user information and the clustering feature; and when it is determined that the other user is likely to belong to the user cluster:

add the other user to the user cluster, and apply the personalization of the user cluster to the other user.

* * * * *